United States Patent

[11] 3,582,105

| | | | |
|---|---|---|---|
| [72] | Inventor | Charles W. Reynolds | |
| | | 308 N. 21st St., Banning, Calif. 92220 | |
| [21] | Appl. No. | 772,691 | |
| [22] | Filed | Nov. 1, 1968 | |
| [45] | Patented | June 1, 1971 | |

[54] VEHICLE SUSPENSION WITH ADJUSTABLE TANDEM AXLES
3 Claims, 7 Drawing Figs.

[52] U.S. Cl. .................................................. 280/104.5, 280/80
[51] Int. Cl. ..................................................... B60g 5/04
[50] Field of Search ......................................... 280/104.5

[56] References Cited
UNITED STATES PATENTS

| 2,131,083 | 9/1938 | Winn | 280/104.5 |
| 2,343,301 | 3/1944 | Knox | 280/104.5 |
| 3,071,391 | 1/1963 | Dye | 280/104.5 |
| 3,363,913 | 1/1968 | McFarland | 280/104.5 |

FOREIGN PATENTS

| 1,231,780 | 4/1960 | France | 280/104.5 |

*Primary Examiner*—A. Harry Levy
*Attorney*—White & Haefliger

ABSTRACT: The disclosure concerns a vehicle suspension system employing rotatable tandem axles and wheels carried eccentrically by the axles, with structure interconnecting the axles for yieldably resisting axle rotation, that structure being adjustable to rotate both axles for raising or lowering the vehicle body relative to the wheels.

PATENTED JUN 1 1971

INVENTOR.
CHARLES W. REYNOLDS
BY White & Haefliger
ATTORNEYS.

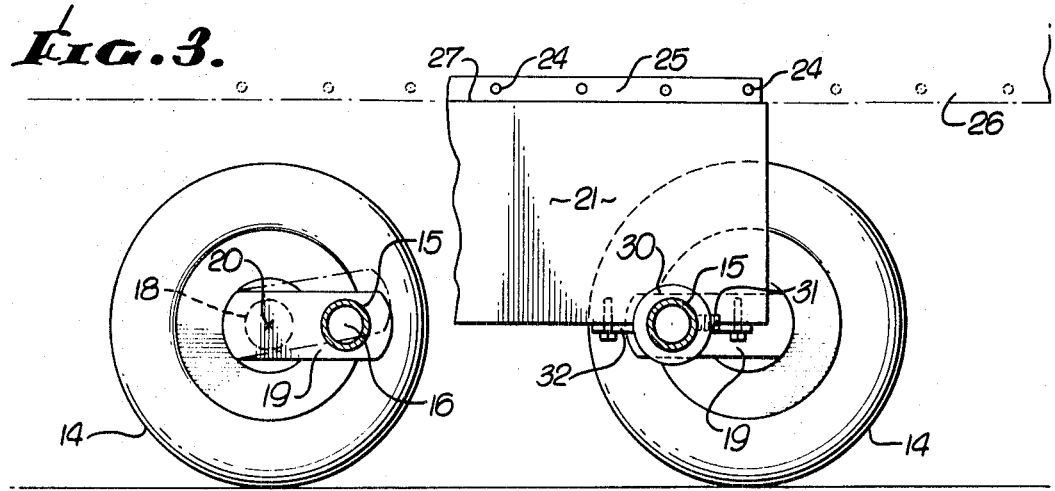
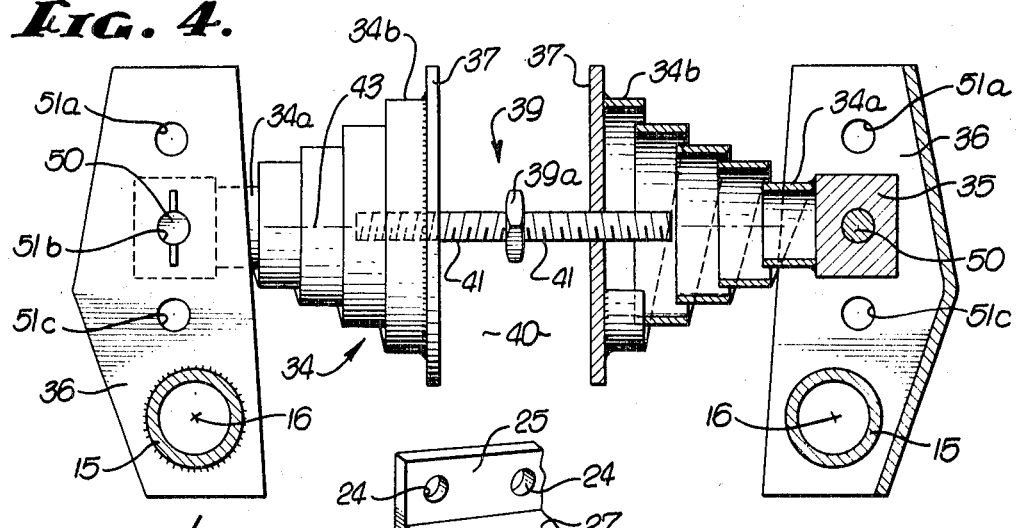
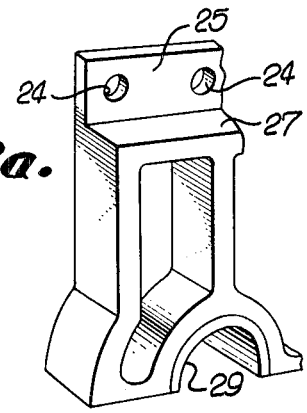
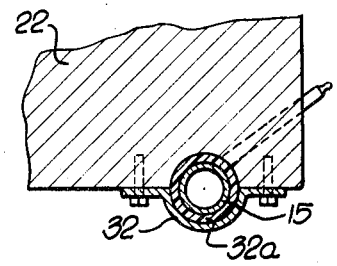
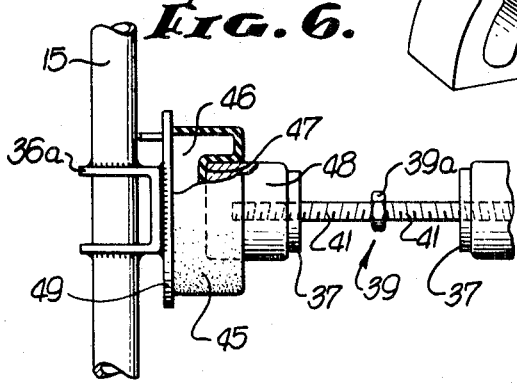
INVENTOR.
CHARLES W. REYNOLDS
By White & Haefliger
ATTORNEYS.

VEHICLE SUSPENSION WITH ADJUSTABLE TANDEM AXLES

BACKGROUND OF THE INVENTION

This invention relates generally to vehicle suspension systems, and more particularly concerns a tandem wheel system wherein the rotation of tandem axles is controllable and adjustable to provide multiple benefits.

Past tandem wheel suspensions for vehicles have not, to my knowledge, afforded those combinations and subcombinations of unusual advantages characterizing the present invention. Among such advantages are the provision of a single adjustment for raising or lowering the vehicle body relative to the wheels; the provision for yieldable load transfer between tandem axles during vehicle turning around a corner in such manner as to result in lowering of the body relative to the wheels; the provision for advantageous load transfer between tandem axles during vehicle wheel travel over a road bump or bumps; the provision for adjustable interconnection of the tandem axles in such manner as to accommodate the vehicle suspension to loads of greatly differing weight; the provision for ready adaptation of the suspension system to vehicle bodies of different size and configuration; the provision of tandem axles which are not subject to "scissoring" during vehicle travel along a curved path; the need to maintain fewer joints and bushings; and other advantages as will appear.

SUMMARY OF THE INVENTION

It is a major object of the invention to provide a vehicle suspension system in which the deficiencies of prior systems, as outlined above, are overcome. Basically, the new suspension comprises tandem pairs of wheels; and means including a pair of axles supporting the body by transmission of loading to the wheels, the axles having generally parallel axles and two wheels being carried by each two axle and eccentrically with respect to the axle axes so that the two axles tend to rotate about their axes in response to imposition of body weight; further, such means includes structure interconnecting the axles for yieldably resisting axle rotation, that structure having an adjustment operable to rotate both axles simultaneously for raising or lowering the body relative to the wheels. Typically, the interconnecting structure includes at least one spring through which loading is transmitted between the axles to yieldably resist their rotation, and such spring may advantageously comprise a coiled leaf spring or pneumatic device connected in such manner as to facilitate the adjustment referred to as well as additional adjustment connection to the axles so as to achieve accommodation of the suspension to much higher load imposition. As regards the latter, the structure may include arms on the axles and spring load transmitting elements connected to the arms, there being at least two locations at which one element is connectable to one arm, the locations being at different distances from the axis of the axle associated with that arm.

Additional objects include the provision of an adjustment as referred to in the form of interfitting threaded members through which loading is transmitted between the axle arms, one of the members being rotatable relative to the other to vary the spacing between the arms for a given body load; and the provision of spaced flanges attached to and depending from the body with provision for adjustable attachment to different vehicle bodies; the flanges supporting the axles so that the interconnecting structure extends between the flanges.

These and other objects and advantages of the invention, as well as the details of illustrative embodiments, will be more fully understood from the following detailed description of the drawings, in which:

BRIEF DESCRIPTION OF THE DRAWINGS

FIG. 3 is a side elevation, partly in section, taken on lines 3-3 of FIG. 2;

FIG. 3a is a perspective of an adapter flange;

FIG. 4 is an enlarged section taken on lines 4-4 of FIG. 2;

FIG. 5 is an enlarged section taken on lines 5-5 of FIG. 2; and

FIG. 6 is a fragmentary view showing a modified plan of the invention.

DESCRIPTION OF PREFERRED EMBODIMENTS

Figure 1:
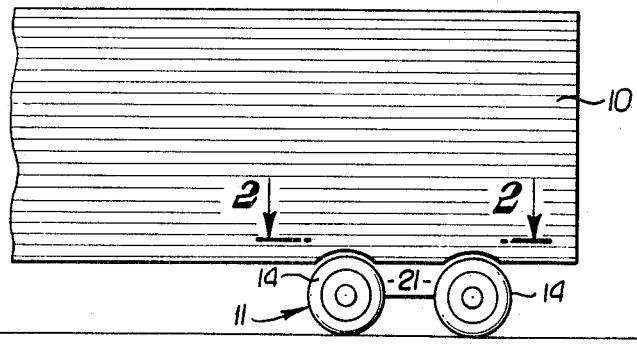
FIG. 1 is an elevation illustrating a trailer with a suspension incorporating the invention.

Referring to FIG. 1—5, one form of vehicle body is seen at 10 as supported by the adjustable suspension 11 of the invention. The body 10 is illustrative only, for it is a feature of the invention that the suspension may be readily adapted to many different types of vehicle bodies with various bed widths.

Generally speaking, the suspension 11 comprises tandem pairs 12 and 13 of wheels 14; and means including a pair of axles 15 supporting the body 10 by transmission of loading to the wheels. The axles have generally parallel axes 16 and two wheels 14 are carried eccentrically by each axle so that the axles tend to rotate bodily about their axes 16 in response to imposition of body weight. In this regard, the wheels may be directly carried by pinions 18 which are connected by cranks 19 to opposite ends of the main axles 15, the axes 20 of rotation of the wheels on the pinions being parallel to and offset from the axle axes 16.

Figure 2:
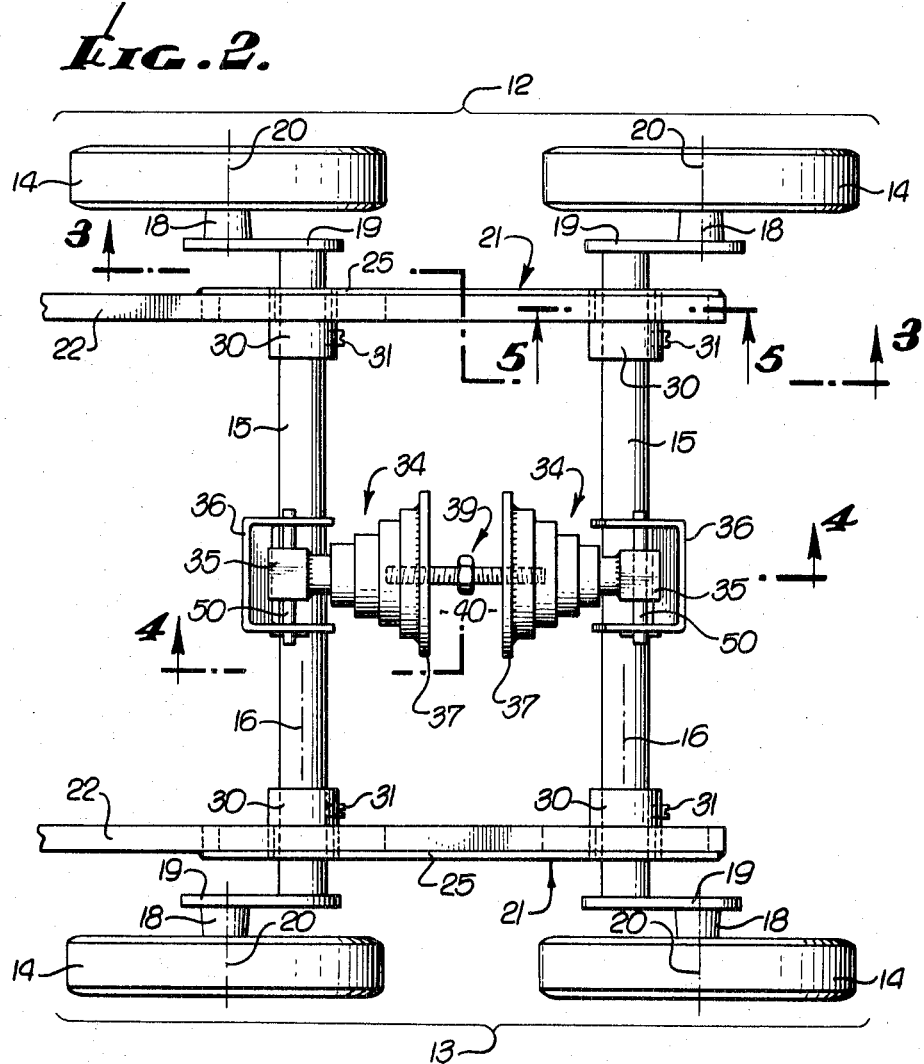
FIG. 2 is an enlarged plan view taken on lines 2-2 of FIG. 1.

The body support means may include a pair of flanges 21, which are laterally spaced apart as in FIG. 2 and which depend from rails 22 at the under side of the body 10. A modified flange is seen in FIG. 3a, and the flanges have in common the capacity for adjustable attachment to the rails, as by means of lateral bolt holes 24 on the upstanding portions 25 of the flanges. Thus, the rails 26 may seat on the flange upper shoulders 27, and the flanges may be adjusted lengthwise of the rails until bolt holes in the flanges and rails come into registration at the desired location of the suspension beneath the body. Further, the lateral separation of the flanges in accordance with different lateral separation of the rails of various bodies may readily be accommodated by the suspension, since the lateral positions of the bearings 29 relative to the axles may be adjusted. Thus, the axles 15 are receivable upwardly into the tandem pairs of bearings 29 carried by the two flanges 21; the two axles are laterally centered; and the axles are then blocked against lateral movement relative to the flanges as by clamping of adjustable blocks 30 to the axles as seen in FIG. 2. When setscrews 31 are tightened, the blocks 30 prevent lateral, or out of center, displacement of the axle by interference engagement with the inner sides of the flanges 21. Suitable straps 32 retain the axles in bearings 29, as seen in FIG. 5, bearing inserts 32a being carried by the straps.

In accordance with an important aspect of the invention, the body support means also including structure interconnecting the axles for yieldably resisting axle rotation, that structure having an adjustment operable to rotate both axles simultaneously for raising or lowering the body 10 relative to all the wheels. In the illustrated form of the invention, that structure includes at least one, and typically two springs through which loading is transmitted between the axles to yieldably resist rotation thereof. Illustrative springs are designated at 34 and are advantageously in the form of coiled leaf springs wound in helices so that the spring turns are telescopically movable, as better seen in FIG. 4. The small end turns 34a, of the springs are connected to elements 35 which are in turn carried by upright channel-shaped arms 36 rigidly attached to the axles 15. The springs 34 extend in the space between arms 36, and their large end turns 34b are rigidly connected to plates 37 which faces one another in spaced-apart relation.

The above referred to adjustment may advantageously include interfitting threaded members through which loading is transmitted between the arms, one of the members being rotatable relative to the other to vary the spacing between the arms 36 for a given body load, thereby to adjust the height of the body 10 relative to the ground level. Such members may, for example include the rotatable member 39 having a wrench-grippable nut 39a in space 40 and oppositely extending shanks 41 respectively forming left- and right-hand threads. The latter have thread connection with the plate members 37, so that as member 39 is rotated, the plates are moved relatively toward or away from each other. Accordingly, one simple adjustment effects lifting or lowering of the trailer body relative to all the wheels. In this regard, note that the springs have axes 43 generally parallel to the direction of load transmission between the axles.

An alternate form of spring is seen in FIG. 6 to comprise a yieldable chamber, as for example a rubber "boot" 45, containing compressible gas at 46. Note that each boot is reentrant at 47 to receive and center a plunger 48 which is operable to pressurize the boot. Member 39 may be adjustable with respect to plates 37 carried by the plungers, in the manner described above. The boots are also carried by plates 49 attached to arms 36a rigidly connected to the axles 15.

Finally, the provision is made for accommodating the suspension to greatly different loads on or in the trailer body or bed. As seen in FIGS. 2 and 4, load transmitting pin elements 50 are removably connected to the bearing elements 35 and arms 36, there being at least two, and typically several locations (as for example openings 51a, 51b and 51c) at which a pin element 50 is connectable to an arm. Such locations are at different, predetermined radial distances from the axis 16 of the associated axle 15 whereby a crank arm of selectable length is created. For higher trailer loads, the pin or pins 50 are movable from a hole location closer to axis 16 to a hole location further from that axis, whereby the load transmitted by the adjustment structure 39 and springs 34 is prevented from increasing to the extent it otherwise would in the absence of such provision for pin shifting. This feature extends the useful load bearing range of the trailer to which the suspension system of the invention is connected.

It is found that when a trailer with the above suspension turns a corner, the centrifugal force creates a moment of force which acts to push the trailer bed down on the outer side by relative upward rotation of the wheels about axes 16; further, the axles transmit this rotation to the wheels on the inside of the turn, so that the bed also lowers on the inside, whereby the whole trailer tends to set down or lower when turning, for increased stability. Also, the axles do not "scissor" on a turn, (or the inner and outer wheels do not move differentially to simulate such scissoring) due to the parallel relationship of the axles and the connection of laterally opposite wheels to the same axle. Finally, as the trailer goes over a bump, the front wheels of the suspension go up, and the front axle rotates to transmit force tending to rotate the rear axle in a direction to lower the rear wheels, whereby the bump load is absorbed by all wheels.

I claim:

1. In combination with a vehicle body, a suspension comprising
    tandem pairs of wheels,
    and means including a pair of axles supporting said body by transmission of loading to the wheels, the axles having generally parallel axes and two wheels being carried by each axle and eccentrically with respect to the axle axis so that the two axles tend to rotate bodily about said axes in response to imposition of body weight.
    said means including structure interconnecting the axles for yieldably resisting said axle rotation, and said structure having an adjustment operable to rotate both axles simultaneously for raising or lowering the body relative to all wheels,
    said structure including arms on said axles, at least one compression spring through which loading is transmitted between said arms, and said adjustment including interfitting threaded members through which loading is transmitted between the arms, one of said members being rotatable relative to the other to vary the spacing between said arms and thereby adjust the height of the vehicle body for a given body load, said arms projecting upright below the vehicle body and said one member being openly exposed for manually adjustable rotation at a location between said upright arms.
    said body supporting means including spaced flanges attached to and projecting downwardly from the body, said axles being supported by said flanges, substantially below body level, and adjustable means for maintaining the axles centered relative to said flanges, said upright arms being located between said flanges,
    said structure including load transmitting pin elements connected to said arms, there being at least two separate hole locations at which one pin element is connectable to one arm, said locations being at different distances from the axis of the axle associated with said one arm.

2. The combination of claim 1 in which said body comprises a trailer.

3. The combination as defined in claim 1 in which said spring comprises a coiled leaf spring having an axis generally parallel to the direction of load transmission between the upright arms.